United States Patent
Heidrich et al.

[11] 3,898,585
[45] Aug. 5, 1975

[54] LEAKY CORRUGATED OPTICAL WAVEGUIDE DEVICE

[75] Inventors: Paul F. Heidrich, Mahopac; Peter Stephen Zory, Jr., Ossining, both of N.Y.

[73] Assignee: International Business Machines Corporation, Armonk, N.Y.

[22] Filed: Jan. 14, 1974

[21] Appl. No.: 432,926

[52] U.S. Cl............................ 331/94.5; 350/96 WG
[51] Int. Cl................................................ H01s 3/00
[58] Field of Search................ 331/94.5; 350/96 WG

[56] References Cited
OTHER PUBLICATIONS

Zory, Laser Oscillation in Leaky Corrugated Optical Waveguides, App. Phys. Lett., Vol. 22, No. 4 (Feb. 15, 1973) pp. 125–128.

*Primary Examiner*—William L. Sikes
*Attorney, Agent, or Firm*—Sughrue, Rothwell, Mion, Zinn & Macpeak

[57] ABSTRACT

Diffracted leaky optical waves are coupled out of a thin film optical waveguide device having one surface which is periodically thickness-modulated or corrugated to form an optical diffraction grating. The waveguide device is constructed such that the average thickness of the waveguide in the complex refractive index of the waveguide or one of the layers surrounding the waveguide is varied when an external power source applied to the device is varied and thereby, a parameter of the leaky wave in accordance with the variable power source. In one embodiment, the waveguide is made of light amplifying material which is suitably excited to produce lasing action and cause an optical wave to propagate in the waveguide. The variable parameter in this case is the wavelength of the leaky wave, and the leaky wave is always normal to the plane of the diffraction grating. Consequently, a tunable laser is provided. In a second embodiment, no lasing occurs, but instead, an external light source is used to cause an optical wave to propagate in the waveguide. The parameter which is varied is the angle between the leaky wave and the normal to the diffraction grating, the wavelength of the leaky wave remaining constant.

8 Claims, 7 Drawing Figures

PATENTED AUG 5 1975 3,898,585

SHEET 1

LEAKY CORRUGATED OPTICAL WAVEGUIDE DEVICE

BACKGROUND OF THE INVENTION

1. Field of the Invention

The present invention relates to the field of optical physics and, more particularly, to a class of devices employing leaky corrugated optical waveguides which may function as a tunable laser source or light beam deflector.

2. Description of the Prior Art

Corrugated waveguides, that is, optical waveguides having portions which are thickness modulated to form a diffraction grating, have been employed in the prior art for purposes of optical coupling. An example of such device is described in U.S. Pat. No. 3,674,335 issued July 4, 1972 to A. Ashkin et al. and assigned to Bell Telephone Laboratories. In this example, coherent light is coupled into the waveguide by means of an optical reflection grating formed in the surface of the guide opposite the surface on which the light is incident.

It is known that laser oscillation can be obtained on the guided modes of planar film waveguides by using a light-amplifying dye dissolved in the film to provide the gain and backward intramode diffraction from a spatially periodic modulation of the film's complex refractive index to provide the feedback.

It is also known that laser oscillation can be obtained on the guided modes of planar film waveguides by using a light amplifying dye dissolved in the film to provide the gain and backward intramode diffraction from a spatially periodic modulation of the film's thickness (i.e. corrugation) to provide the feedback.

SUMMARY OF THE INVENTION

The present invention is distinct from the known prior art in that the corrugation or diffraction grating is not used to couple light into the waveguide, but rather is used to couple a leaky wave out of the waveguide. Furthermore, depending upon the design of the waveguide device, a variable power source is used to vary the average waveguide thickness or the complex refractive index of the waveguide or surrounding layers either to provide a tunable laser, or else to provide a wide aperture light deflector.

In further discussion, the variable power source will be specified to be an electric field or voltage which varies only the refractive index of the waveguide. Other power sources of for example an optical, acoustical or magnetic nature might also be utilized not only to vary the complex refractive index of the waveguide but also the index of the surrounding layers and the average thickness of the waveguide.

Therefore, it is an object of the present invention to provide a leaky waveguide device which may function either as a tunable laser source or as a light deflector.

Another object of the present invention is to provide a device which functions as a tunable laser source, such device including a corrugated optical waveguide structure bounded by electrodes which are connected to a variable voltage source.

A still further object of the present invention is to provide a tunable laser source including an optical waveguide amplifying medium, the refractive index of which is temporally modulated to vary the wavelength of mode oscillations and to therefore vary the wavelength of the resultant wide aperture output beam.

Another object of the present invention is to provide a laser source including a thin film corrugated optical waveguide wherein, when second diffraction order intramode feedback is employed to obtain laser oscillation, the first diffraction order laser beam is constrained to emerge from the waveguide as a leaky light wave in a plane normal to the plane of the waveguide.

Still another object is to provide a light deflector employing a thin film corrugated optical waveguide which is designed such that the second diffraction order does not exist, whereby a variable electric field can be used to vary the refractive index of the waveguide, thereby varying the exit angle of the first diffraction order beam relative to the normal to the plane of the waveguide.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
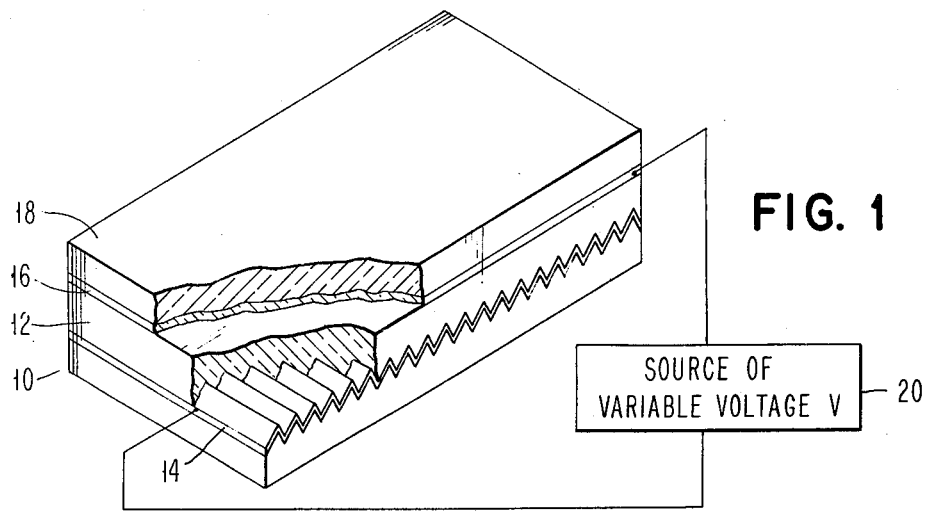
FIG. 1 is a perspective illustration of one embodiment of a leaky corrugated optical waveguide device in accordance with this invention.
Figure 2:
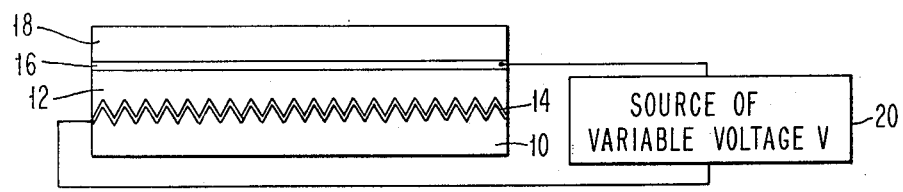
FIG. 2 is a side elevational view of the device illustrated in FIG. 1.

Referring to FIG. 1, one embodiment of a leaky corrugated optical waveguide device according to the present invention is illustrated. The elements of the device include a substrate 10 which may be composed of quartz, glass or similar material. Located above substrate 10 is a thin film dielectric optical waveguide 12 which is thickness modulated on one wall. The thickness modulation feature will be hereinafter referred to by the term "corrugated" and the corrugated wall functions as a diffraction grating. The film is electro-optical, i.e. its refractive index is dependent upon the strength of an electric field applied to the film. Interposed between substrate 10 and waveguide 12 is an electrode 14 which may be composed of indium oxide or a suitable metal. Electrode 14 is preferably light opaque to prevent light waves from leaking therethrough. Since the wall of waveguide 12 is periodically corrugated, in order to form a unit structure, the electrode 14 and substrate 10 have corresponding periodic variations. Since electrode 14 tends to be lossy, a thin buffer layer (not shown), having a refractive index different from that of the waveguide 12, may be interposed between 12 and 14.

A second light transparent electrode 16 is located on the planar surface of waveguide 12 and may be composed of indium oxide. A superstrate or upper layer 18 is located above second electrode 16. The upper layer 18 may be composed of quartz, glass or the like.

To complete the device, a means is provided to modulate the refractive index of the thin film corrugated optical waveguide 12. This modulation means preferably is a source 20 of variable voltage V connected between the lower and upper electrodes 14 and 16, respectively.

Figure 3:
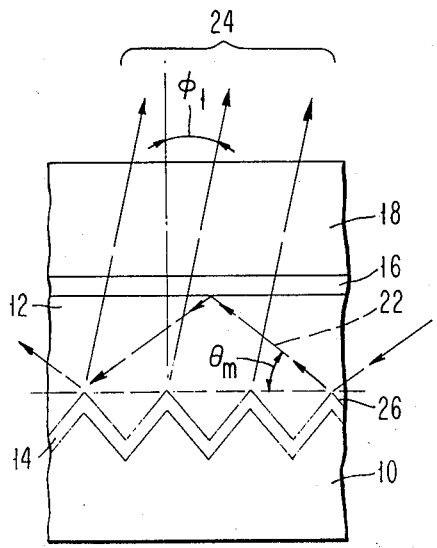
FIG. 3 is an illustration indicating the light propagation mode within the waveguide device of FIG. 1 and the wide aperture leaky output beam which emerges from the device when it is operated as a light deflector.
Figure 4:
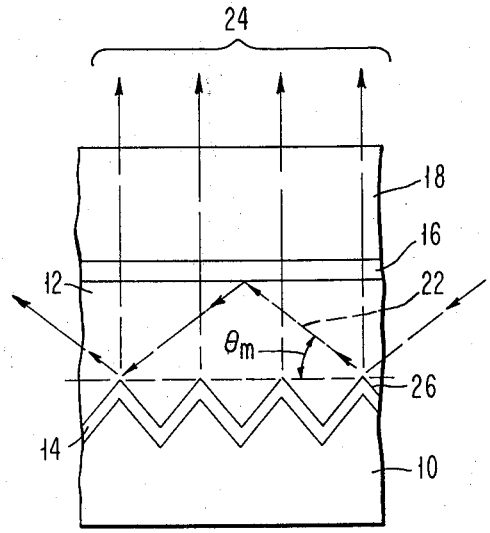
FIG. 4 is another illustration of the light propagation mode within the waveguide device of FIG. 1 when it is operated as a tunable laser, and wherein second diffraction order intramode feedback is employed to obtain laser oscillation such that the first diffraction order laser leaky output beam is constrained to emerge from the waveguide in a direction normal to the plane of the waveguide regardless of the variation in frequency or wavelength of the output beam.

The waveguide device includes a thickness modulated (i.e., corrugated) optical waveguide wherein the modulation period (or pitch of the resulting diffraction grating) is such that the light 22 in the propagating mode of the waveguide continuously loses energy to the leaky wave, which is the output wave 24 depicted in FIGS. 3 and 4.

The diffraction grating formed by the corrugated wall of the waveguide 12 can provide a leaky wave intensity profile which is generally constant over the decay length of the propagating mode if the groove shape function along the length of the guide is fabricated appropriately.

FIGS. 3 and 4 illustrate how the deflection of the leaky wave output beam is achieved in both embodiments of the invention. These figures illustrate the "bounce picture" of the waveguide propagation wherein laser light in a given mode $m$ can be illustrated as bouncing or reflecting along waveguide 12 at a bounce angle $\theta_m$ characteristic of the propagation mode $m$ for that structure. $\theta_m$ is defined as the angle between the plane of the diffraction grating formed by the corrugated surface 26 and the propagating beam 22. The exit angle of the first diffraction order leaky output beam is designated $\phi_1$ and is + or − depending upon the azimuth of the leaky beam relative to the normal 28 to the plane of the diffraction grating or to the planar waveguide device.

As will be described in more detail below, in the FIG. 3 embodiment, the propagating mode is excited by an external laser source, and the variable voltage across electrodes 14 and 16 causes the exit angle $\phi_1$ of the leaky output beam to vary about the normal line 28. In the FIG. 4 embodiment, the waveguide 12 is made of light amplifying material which is pumped to excite the propagating mode; the variable voltage then varies the wavelength or frequency of the leaky output beam 24 which is constrained to be normal to the planar waveguide device, thereby forming a tunable laser source having a unidirectional output beam.

Figure 5:
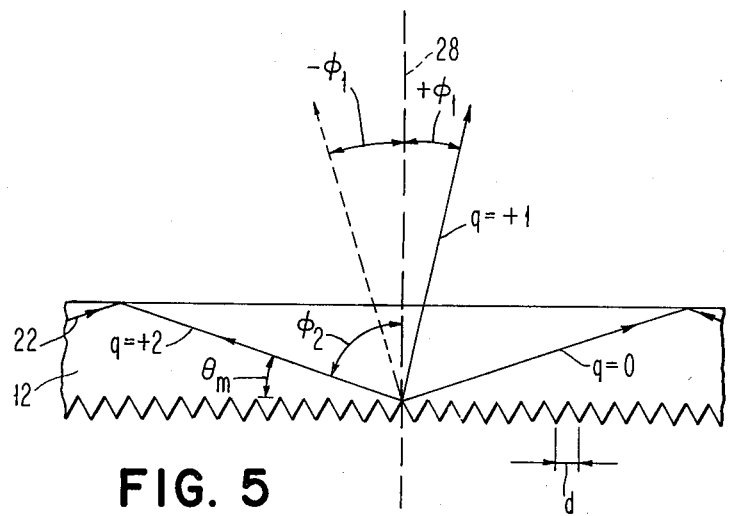
FIG. 5 is a schematic diagram illustrating the principle of operation of the waveguide device of this invention.

FIG. 5 shows three diffraction orders ($q = 0$, $q = +1$ and $q = +2$) for one mode m of propagation of a light wave in the corrugated optical waveguide 12. The zero order is the beam which would exist if there were no corrugation or diffraction grating. The first order beam ($q = 1$) is the leaky output beam.

The exit angle $\phi_1$ for the first order beam is obtained from the diffraction grating equation:

$$n_f \cos\theta - q\frac{\lambda}{d} = n\sin\phi_1 \quad (1)$$

where $n_f$ is the refractive index of the thin film waveguide 12, $\theta$ is the bounce angle, $q$ is the diffraction order equal to 1 in this case, $\lambda$ is the propagating wavelength, $d$ is the grating pitch, and $n$ is the refractive index of the medium into which the output beam ultimately exits.

The term $n_f \cos\theta$ is the effective refractive index of the guided mode $m$, or the "effective mode index". By changing the effective mode index, the exit angle $\phi$ can be changed. As previously stated, either $n_f$ or $\theta$ can be changed by the use of a variable power source of an electrical, optical, acoustical or magnetic nature. It is the angle $\theta$ which is varied when either the refractive index of one of the surrounding layers (e.g., layers 10, 14, 16 and 18) is varied or when the average thickness of the waveguide is varied. As explained below, in the tunable laser embodiment, angle $\phi$ is zero, and therfore the wavelength becomes proportional to the effective mode index, $n_f \cos\theta$.

When the device is used as a light deflector, an externally supplied laser beam of wavelength $\lambda$ propagates in the waveguide. For the operation of the device as a single ouput beam deflector, as opposed to laser operation, the $q = +2$ diffraction order must not exist. That is, the exit or reflection angle $\phi_2$ of the second order beam must be greater than $-90°$. In other words, $\sin\phi_2 \leq -1$. To find the limiting periodic pitch $d$ of the diffraction grating, we then solve the diffraction grating equation (1) for $\sin\phi_2 = -1$, $q = 2$, and $n = n_f$. Therefore, assuming that the index of refraction $n_f$ of the optical waveguide film is 1.5, $\theta \approx 0$ and $\lambda$ is 0.5 microns, we then find that d is equal to 0.33 microns. In other words, for the deflector case in which the second diffraction order beam must not exist, the pitch $d \leq .33$ microns for the parameters selected above.

For the special case $d = 0.33$ microns, equation (1) with $q = 1$ yields $\phi_1 = 0$ or the leaky first order wave is normal to the plane of the diffraction grating.

For bounce angle $\theta_m$ near zero, the change $\Delta\phi_1$ in angle $\phi_1$ is approximately proportional to the change $\Delta n_f$ in refractive index $n_f$ of the thin film waveguide. $\Delta\phi_1$ is also proportional to the number of resolvable spots obtainable from the deflector.

If the film waveguide is made of $Ta_2O_5$, then utilizing the quadratic electro-optic effect in such a material, one can obtain a $\Delta n_f$ approximately equal to $10^{-3}$ for an electric field change $\Delta E$ of approximately $10^6$ volts/centimeter. Similarly, using a liquid crystal thin film waveguide, one can obtain $\Delta n_f$ approximately equal to $10^{-2}$ by varying the applied electric field to obtain $\Delta E$ of approximately $10^6$ volts per centimeter.

Figure 6:
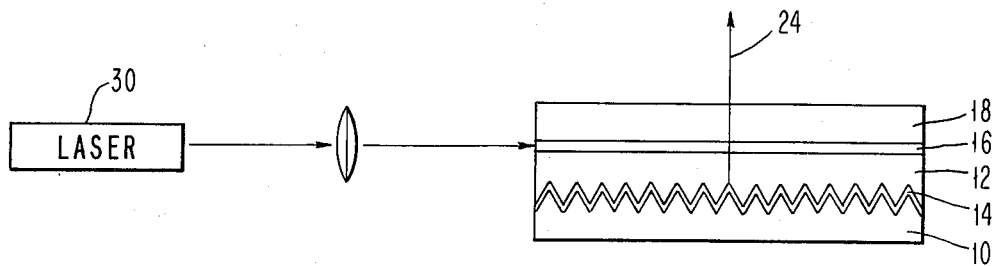
FIG. 6 is a schematic diagram of the waveguide device when operated as a light deflector as illustrated in FIG. 3.

As shown in FIG. 6, when the device is used as a light deflector, an external laser source 30 directs a laser beam into the edge of the waveguide 12 to excite a propagating mode within the guide.

For laser operation, the optical waveguide film 12 is made of a material which when pumped appropriately becomes a light amplifier over some range of wavelengths, $\Delta\lambda$. For laser operation, the second order diffraction beam ($q = +2$) for some $\lambda$ within $\Delta\lambda$ must be reflected back on the propagating wave 22; that is, $\phi_2$ must be equal to $$-\frac{\pi}{2} - \theta_m$$

Again using the diffraction grating equation where $q$ is now equal to 2, $$n_f \cos\theta_m - q\frac{\lambda}{d} = n_f \sin\phi_2, \qquad (2)$$

and trigonometric conversions, it can be shown that:

$$n_f \cos\theta = \frac{\lambda}{d} \qquad (3)$$

Substituting this equality into the diffraction grating (1) for the first order diffraction where $q = 1$, we find that the exit or deflection angle $\phi_1$ for the first order beam equals 0. That is $\phi_1$ is completely independent of any change in the film's index of refraction $n_f$, and the leaky wave is always normal to the plane of the waveguide structure. Varying the electric field applied to the optical waveguide film causes changes in the refractive index $n_f$. Since $\theta$ in equation (3) is approximately independent of $\lambda$, any changes in $n_f$ changes the wavelength of frequency of the propagating wave 22 and thereby that of the leaky wave 24. Consequently, there is provided a tunable frequency laser in which the exiting leaky output wave is always normal to the plane of the waveguide.

Figure 7:
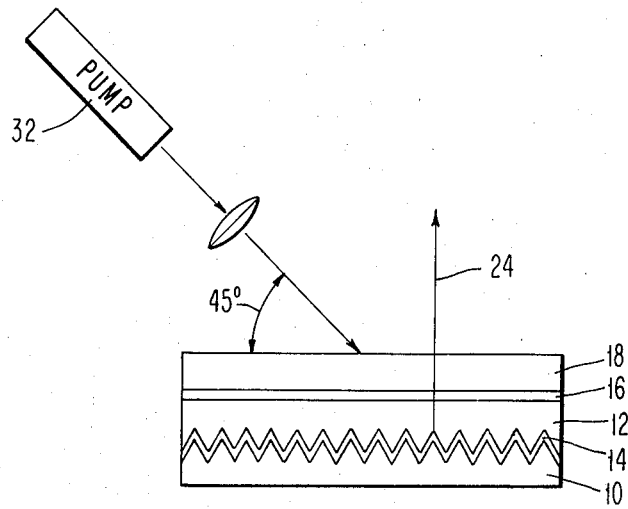
FIG. 7 is a schematic diagram of the waveguide device when operated as a tunable laser source as illustrated in FIG. 4.

As shown in FIG. 7, when the waveguide device is operated as a laser, the pump 32 (in this case an optical pump) excites a guided mode whose power simultaneously leaks from the waveguide and feeds back on itself. The function of the waveguide corrugation or diffraction grating in this case is similar to that performed by the output mirror of a conventional laser, which provides both the optical leak or ouput from the laser cavity and the feedback necessary for oscillation.

In one form of the laser embodiment of the invention, the film waveguide 12 is made by sandwiching glycerol containing about $1.2 \times 10^{18}$ molecules per centimeter of Rhodamine 6G dye between an aluminized blazed diffraction grating and a quartz optical flat. The refractive indices of these materials at a wavelength of 0.6328 micron are 1.4654, 1.4566 and 1.2–1.7 for the film, quartz, and aluminum, respectively. The film thickness is chosen to be 16.3 microns. Such a material can be caused to lase by pumping it with green or ultraviolet light.

While the invention has been particularly shown and described with reference to the preferred embodiments thereof, it will be understood by those skilled in the art that various changes in form and details may be made therein without departing from the spirit and scope of the invention.

What is claimed is:

1. A leaky corrugated optical waveguide device comprising:
   a. a thin film, thickness modulated, dielectric optical waveguide whose opposite surfaces are planar and corrugated, respectively, the corrugated surface forming a diffraction grating with a pitch $d$ for reflecting various diffraction orders of the propagating wave, said waveguide having an index of refraction $n_f$ at a light wavelength $\lambda$; and
   b. a light-transparent first planar electrode overlying said planar surface of said waveguide;
   c. a second planar electrode overlying said corrugated surface;
   d. means for causing a light wave to propagate in said waveguide, whereby a leaky light wave of the first diffraction order of the propagating wave is reflected from said corrugated surface and transmitted through said planar surface and said first electrode; and
   e. means for applying a variable electric potential across said electrodes to vary $n_f$ and thereby a parameter of the leaky wave.

2. A device as defined in claim 1 wherein said parameter is the angle of the leaky light wave relative to the normal to said planar surface and the pitch $d$ is such that the second diffraction order of said propagating wave does not exist whereby the angle of the transmitted leaky light wave relative to the normal to said planar surface is dependent upon said variable electric potential.

3. A device as defined in claim 1 wherein said parameter is the wavelength of the transmitted leaky light wave, the waveguide is made of light amplifying material, and the pitch $d$ is such that the second diffraction order is reflected back on the propagating light wave, and further comprising means for pumping said waveguide to produce by lasing action the propagating wave at wavelength $\lambda$, whereby the transmitted leaky light wave is constrained to be normal to said planar surface, while the wavelength of the leaky light wave is dependent upon said variable electric potential.

4. A leaky corrugated optical waveguide device comprising:
   a. a thin film, thickness modulated, dielectric waveguide whose opposite surfaces are planar and corrugated, respectively, the corrugated surface forming a diffraction grating with a pitch $d$ for reflecting various diffraction orders of a propagating light wave in the waveguide;
   b. means for causing a light wave beam to propagate in said waveguide in a guided mode $m$, whereby a leaky light wave of the first diffraction order of the propagating wave is reflected from said corrugated surface and transmitted through said planar surface of said waveguide; and
   c. means for varying the effective refractive index of the guided mode $m$ and, thereby, a parameter of the leaky wave, where said effective refractive index is defined by $n_f \cos\theta$, where $n_f$ is the refractive index of said film for the mode $m$, and $\theta$ is the bounce angle between the propagating wave and the plane of said diffraction grating.

5. A device as defined in claim 4 wherein said parameter is the angle $\phi$ of the leaky light wave relative to the normal to said planar surface and the pitch $d$ is such that the second diffraction order of said propagating wave does not exist, and wherein said means for varying said effective refractive index comprises means for varying the average thickness of said waveguide to vary the bounce angle $\theta$, whereby the angle $\phi$ of the transmitted leaky light wave is dependent upon the variation of the average waveguide thickness.

6. A device as defined in claim 4 wherein said parameter is the angle $\phi$ of the transmitted leaky light wave relative to the normal to said planar surface and the pitch $d$ is such that the second diffraction order of said propagating wave does not exist, and further comprising superstrate and substrate layers on said planar and corrugated surfaces, respectively, said means for varying said effective refractive index comprising means for varying the refractive index of one of said layers to vary said bounce angle $\theta$, whereby angle $\phi$ of the transmitted leaky light wave is dependent upon the variation of said refractive index of said one layer.

7. A device as claimed in claim 4 wherein said parameter is the angle $\phi$ of the transmitted leaky light wave relative to the normal to said planar surface and the pitch $d$ is such that the second diffraction order of said propagating wave does not exist, and wherein said means for varying said effective refractive index comprises means for varying the refractive index $n_f$, whereby the angle $\phi$ of the transmitted leaky light wave is dependent upon $n_f$.

8. A device as defined in claim 7 wherein said means for varying the refractive index $n_f$ comprises means for applying a variable electric potential between said planar and corrugated surfaces of said waveguide.

* * * * *